United States Patent

Michael et al.

[15] 3,696,138
[45] Oct. 3, 1972

[54] METHOD OF PRODUCING 2-(CHLOROMETHYL) ALLYL-SUBSTITUTED SILANES

[72] Inventors: Keith W. Michael; William E. Dennis, both of Midland, Mich.

[73] Assignee: Dow Corning Corporation, Midland, Mich.

[22] Filed: May 28, 1971

[21] Appl. No.: 148,200

[52] U.S. Cl. .....................260/448.2 E, 260/448.2 Q
[51] Int. Cl. ...............................................C07f 7/08
[58] Field of Search .................260/448.2 E, 448.2 Q

[56] References Cited

UNITED STATES PATENTS 3,413,329   11/1968   Pope et al. ..........260/448.2 E 3,449,393   6/1969   Sattlegger et al....260/448.2 E

OTHER PUBLICATIONS

Noll, " Chemistry and Technology of Silicones," 2nd ed., Academic Press, N.Y. (1968), pp. 150–153.

*Primary Examiner*—Delbert E. Gantz
*Assistant Examiner*—P. F. Shaver
*Attorney*—Robert F. Fleming, Jr., Laurence R. Hobey, Harry D. Dingman, Howard W. Hermann and Norman E. Lewis

[57]         ABSTRACT

When reacting chlorine with methallylsilanes, the yield of 2-(chloromethyl)allylsilanes is increased substantially by carrying out the reaction in the absence of light or other sources of free radicals.

5 Claims, No Drawings

METHOD OF PRODUCING 2-(CHLOROMETHYL) ALLYL-SUBSTITUTED SILANES

This invention relates to the reaction of chlorine with methallylsilanes. More particularly, the present invention relates to an improved method for producing certain 2-(chloromethyl)allyl-substituted silanes.

Chlorine reacts with methallyl-substituted silanes by two routes, both by addition to form 2,3-dichloro-2-methylpropyl-substituted silanes and by substitution to form 2-(chloromethyl)allylsilanes. Because of the high reactivity of the allylic chloride, the 2-(chloromethyl)allylsilanes are valuable organofunctional silanes. Mironov et al., Khim Nauk, 461(1960) C.B. Translation 428, disclose the reaction of (2-methyl)allyltrichlorosilane with chlorine to obtain about 25 percent yield of the addition product and 24 percent yield of the substitution product. The present method, wherein free radicals are excluded from the reaction, gives much higher yields of the desired substitution product.

Thus, in accordance with the invention, there is provided an improved process for preparing 2-(chloromethyl)-allyl-substituted silanes comprising reacting chlorine with silanes of the formula $$X_nSi\underset{R_{3-n}}{|}{-}CH_2{-}\underset{CH_3}{\overset{|}{C}}{=}CH_2$$

in which X is a chlorine or fluorine atom, R is an alkyl radical containing from one to six inclusive carbon atoms, and $n$ has a value of 2 or 3; the reaction being carried out at a temperature of no more than 165°C. and in the absence of free radicals. In addition, the reaction is carried out under conditions which allow liberated hydrogen chloride to be removed from the reaction mixture.

As described above, the reactant silanes include

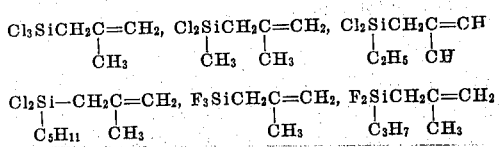

and the like. These silane reactants are readily prepared by the reaction of $X_nR_3$-nSiH with 2,4,4-trimethylpentene-1 by methods well known in the art. If desired, mixtures of silanes can be used as the reactants in the present method.

The reaction of chlorine with the specified methallylsilanes can be depicted as:

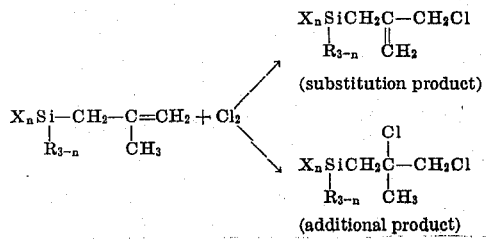

Hydrogen chloride is also obtained as a byproduct of the substitution reaction. To avoid further reaction of the hydrogen chloride with the 2-(chloromethyl)allyl-silane product and resultant decreased yields, the liberated hydrogen chloride must be removed from the reaction mixture. The removal of the acid is most easily accomplished by conducting the reaction in an "open system" whereby the reactants are under atmospheric pressure. The "open system" allows the liberation of HCl and facilitates its removal from the reaction mixture, as contrasted with a "closed system," such as sealed metal pressure vessel.

The other critical factor in obtaining increased yields of the 2-(chloromethyl)allylsilane is minimization of the competing addition reaction. This is accomplished by carrying out the reaction at temperatures below 165°C. and in the absence of free radical sources. At temperatures above 165°C., the generation of free radicals becomes significant to the extent that yields are appreciably decreased. Optimum yields are obtained at temperatures of from 0° to 150°C. External sources of free radicals which must be avoided include ultraviolet light, such as direct sunlight, peroxides in the reaction mixture, and radiation, such as from a cobalt source. If desired, the reaction can be conducted in the presence of oxygen or air which act as inhibitors for free radical activity. The reaction can be carried out in the presence of diffuse light in amounts insufficient to provide free radicals.

The reaction can be easily conducted by allowing chlorine to contact the liquid methallylsilanes such as by bubbling chlorine gas into a vessel of the silane or passing the reactants through a tube-type reactor. It may be necessary to remove the exothermic heat of reaction to maintain the necessary low temperature. This can be accomplished by external cooling means or by addition of an inert diluent, such as nitrogen. The reaction can be carried out in nonreactive solvents, such as hexane or carbon tetrachloride.

The product,

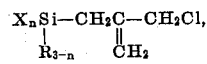

can be separated from the other reaction products by distillation or other means. The 2-(chloromethyl)allyl-silane product can be used as a coupling agent to improve the interfacial bond strength of glass fibers and polypropylene, thus providing high strength glass reinforced polypropylene composite articles.

The following examples are illustrative and are not to be construed as limiting the invention which is defined in the claims.

EXAMPLE 1

Methallyltrichlorosilane (100 grams) was added dropwise to a 14-inch glass condenser packed with glass wool and wrapped with black tape to exclude light. The condenser was cooled with tap water ($\approx 15°$C.). The condenser, mounted vertically, was fitted with a gas inlet at the top into which was fed a mixture of chlorine ($\approx 120$ cc/min.) and nitrogen ($\approx 120$ cc/min.). The reaction products wee collected in a vented flask at the bottom of the condenser.

Analysis of the products by vapor phase chromatography showed that 76 percent of the reactant silane had been converted with

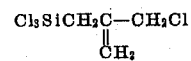

being present in a quantity 15 times greater than that of

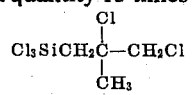

EXAMPLE 2

Methallyltrichlorosilane (25 grams) was added dropwise from a syringe to the top of a 30-inch long, ¼-inch diameter stainless steel tube. The tube was fitted with a water jacket for cooling and a gas inlet at the top. Chlorine was admitted at a rate of 90 cc/min. during the addition of the silane. The tube was not packed and nitrogen was not used as a diluent. Addition was completed after 20 minutes. The products were collected in a vented flask. Analysis of the product showed 57 percent conversion of the reactant silane to mono- and dichlorinated products;

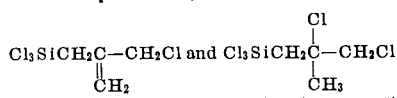

being present in a ratio of 10:1, respectively.

EXAMPLE 3

Methallyltrichlorosilane (20 grams) was placed in a 50 ml., four-neck flask which was fitted with heating and/or cooling means and a stirrer. The lights in the immediate area were turned off but the flask was not wrapped with tape or otherwise shielded. Chlorine was admitted to the flask one inch above the surface of the rapidly stirred liquid silane at a rate of 100 cc/min.. Four reactions, utilizing the described equipment and reactants, were conducted at different temperature ranges for various time periods. Conditions and results are given below:

| Temp. Range (°C.) | Reaction Time (hrs.) | % Yield of $Cl_3SiCN_2C(=CH_2)-CN_2Cl$ |
|---|---|---|
| 0–3 | 2 | 80 |
| 20–62 | ½ | 61 |
| 95–145 | 1 | 75 |
| 100–150 | 1¼ | 76 |

These yields are to be compared to the prior art methods utilizing ultraviolet light which give about 25–30 percent yield of the 2-(chloromethyl)allylsilane. The silane reactant has a freezing point of about −20° C. but the reaction can be run at even lower temperatures by choice of the proper solvent.

EXAMPLE 4

When

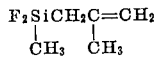

for the silane reactant of Example 1 and procedure of Example 1 is used, substantial yields of

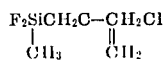

are obtained.

EXAMPLE 5

Trimethylformate (212 grams) was slowly added to 108 grams of 2-(chloromethyl)allyltrichlorosilane. After addition, the mixture was refluxed for 44 hours. The product was distilled to obtain 2-(chloromethyl)allyltri-methoxysilane having a boiling point of 78°C./10 mm. Hg, $n_D^{25}$ of 1.4371 and $d_4^{25}$ of 1.0646.

Glass cloth was immersed in an aqueous solution containing about 0.5 weight percent of 2-(chloromethyl)-allyltrimethoxysilane. The glass cloth was air dried. Polypropylene laminates were formed using this silane-treated glass and, for purposes of comparison, untreated glass cloth. The laminates were formed in a chase mold with two plies of glass separating each sheet of polypropylene film. The film was 20 mils thick. The completed laminates consisted of eight sheets of polypropylene and 14 plies of glass cloth, the glass cloth being laid in a unidirectional vested manner. The lay-ups were placed in a hydraulic press and heated to about 300°F. The laminates were pressed for 20 minutes at 250 psi and 485°F.; then cooled in the press. Three samples of each type of laminate were tested in flexure according to ASTM D790–63. The untreated glass resulted in a laminate flex strength of 14,000 psi as compared to 18,600 psi obtained for the silane-treated glass reinforced laminate. The approximate 30 percent increase in strength demonstrates the utility of the silane as a coupling agent.

That which is claimed is:

1. A process for preparing 2-(chloromethyl)allyl-substituted silanes comprising reacting chlorine with silanes of the formula

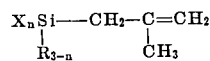

in which
X is a chlorine or fluorine atom,
R is an alkyl radical containing from one to six inclusive carbon atoms, and
n has a value of 2 or 3 while removing hydrogen chloride byproduct from the reaction mixture,
said reaction being carried out at a temperature of no more than about 165°C. and in the absence of any source of free radicals.

2. The process of claim 1 wherein the reactant silane is

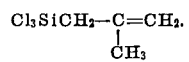

3. The process of claim 1 wherein the reaction is carried out at a temperature in the range from about 0°C. to about 150°C.

4. The process of claim 1 wherein the reaction is carried out in the presence of an inert diluent 5. The process of claim 4 wherein the diluent is nitrogen.

* * * * *